(12) United States Patent
Kang et al.

(10) Patent No.: US 10,494,791 B2
(45) Date of Patent: Dec. 3, 2019

(54) FLOW CONTROL VALVE FOR CONSTRUCTION MACHINE

(71) Applicant: VOLVO CONSTRUCTION EQUIPMENT AB, Eskilstuna (SE)

(72) Inventors: Min-Heuk Kang, Gyeongsangnam-do (KR); Jin-Wook Kim, Gyeongsangnam-do (KR)

(73) Assignee: Volvo Construction Equipment AB, Eskilstuna (SE)

( * ) Notice: Subject to any disclaimer, the term of this patent is extended or adjusted under 35 U.S.C. 154(b) by 207 days.

(21) Appl. No.: 15/536,144

(22) PCT Filed: Jan. 8, 2015

(86) PCT No.: PCT/KR2015/000178
§ 371 (c)(1),
(2) Date: Jun. 15, 2017

(87) PCT Pub. No.: WO2016/111391
PCT Pub. Date: Jul. 14, 2016

(65) Prior Publication Data
US 2017/0350097 A1    Dec. 7, 2017

(51) Int. Cl.
*E02F 9/22* (2006.01)
*F15B 13/02* (2006.01)
(Continued)

(52) U.S. Cl.
CPC .............. *E02F 9/2267* (2013.01); *E02F 3/42* (2013.01); *E02F 9/2225* (2013.01);
(Continued)

(58) Field of Classification Search
CPC ..................... F15B 13/0402; F15B 2011/0243
USPC ........................................ 137/625.66, 625.69
See application file for complete search history.

(56) References Cited

U.S. PATENT DOCUMENTS 5,862,831 A    1/1999  Chung et al.
2003/0115865 A1    6/2003  Koo
(Continued)

FOREIGN PATENT DOCUMENTS

CN    102869837 A    1/2013
CN    103221696 A    7/2013
(Continued)

OTHER PUBLICATIONS

Chinese Official Action (dated Oct. 18, 2018) for corresponding Chinese App. 201580072893.3.
(Continued)

*Primary Examiner* — F Daniel Lopez
*Assistant Examiner* — Matthew Wiblin
(74) *Attorney, Agent, or Firm* — Sage Patent Group

(57) ABSTRACT

A flow control valve for a construction machine includes a boom valve block connected to a hydraulic pump; a boom spool coupled to the boom valve block so as to be slidably moved, and switched on by the supply of pilot signal pressure in order to carry out a boom-up or boom-down operation, thereby controlling the hydraulic oil supplied from the hydraulic pump to a boom cylinder; a boom-up flow control arrangement for supplying the hydraulic oil from the hydraulic pump to the large chamber of the boom cylinder through the boom spool, when switching on the boom spool in order to carry out the boom-up operation; and a boom-down flow control arrangement for returning a part of the hydraulic oil, which returns from the large chamber of the boom cylinder, to the hydraulic tank through the boom spool only at a predetermined pressure or higher, when the boom spool is switched on in order to carry out the boom-down operation, wherein the part of the hydraulic oil, which returns from the large chamber of the boom cylinder, is directly returned to the hydraulic tank through the boom spool, and the part of the hydraulic oil, which returns from the large chamber of the boom cylinder, is made to join, as regeneration flow, the small chamber side of the boom cylinder.

1 Claim, 3 Drawing Sheets

(51) Int. Cl.
*E02F 3/42* (2006.01)
*F15B 1/26* (2006.01)
*F15B 11/08* (2006.01)
*F15B 13/04* (2006.01)
*F15B 13/042* (2006.01)
*F16K 11/07* (2006.01)
*F16K 31/122* (2006.01)

(52) U.S. Cl.
CPC .............. *E02F 9/2285* (2013.01); *F15B 1/26* (2013.01); *F15B 11/08* (2013.01); *F15B 13/02* (2013.01); *F15B 13/0402* (2013.01); *F15B 13/042* (2013.01); *F16K 11/07* (2013.01); *F16K 31/1225* (2013.01); *E02F 9/2271* (2013.01); *F15B 2211/41581* (2013.01); *F15B 2211/428* (2013.01); *F15B 2211/7051* (2013.01)

(56) References Cited

U.S. PATENT DOCUMENTS

| | | |
|---|---|---|
| 2003/0115878 A1 | 6/2003 | Joung |
| 2009/0101854 A1 | 4/2009 | Jeon |
| 2015/0013805 A1* | 1/2015 | Terao ..................... F16K 11/07 137/625.6 |
| 2015/0159678 A1* | 6/2015 | Kim ..................... E02F 9/2267 137/596.14 |

FOREIGN PATENT DOCUMENTS

| | | | |
|---|---|---|---|
| EP | 2733363 A1 | 5/2014 | |
| JP | S62278302 A | 12/1987 | |
| JP | 09210006 A | 8/1997 | |
| KR | 1020100075332 A | 7/2010 | |
| WO | WO-9100431 A1 * | 1/1991 | ............ E02F 9/2221 |
| WO | 2014014146 A1 | 1/2014 | |

OTHER PUBLICATIONS

European Official Action (dated Oct. 9, 2018) for corresponding European App. EP 15 877 112.1.
International Search Report (dated Sep. 17, 2015) for corresponding International App. PCT/KR2015/000178.

* cited by examiner

[FIG. 1]
PRIOR ART
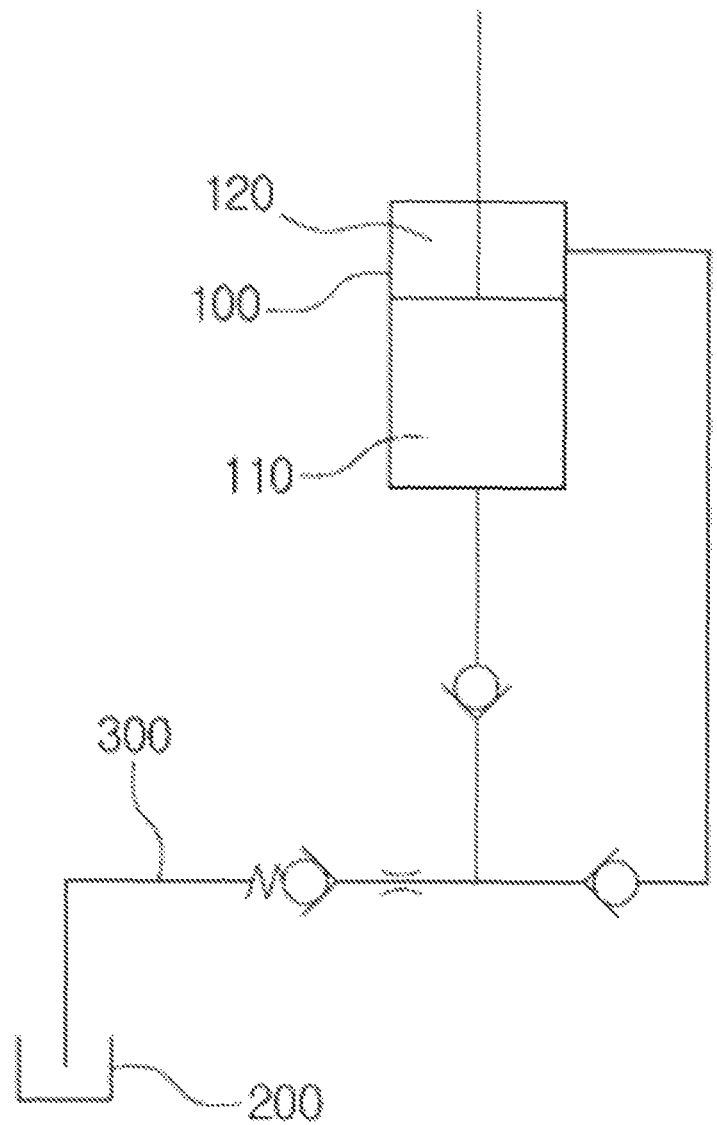

[FIG. 2]
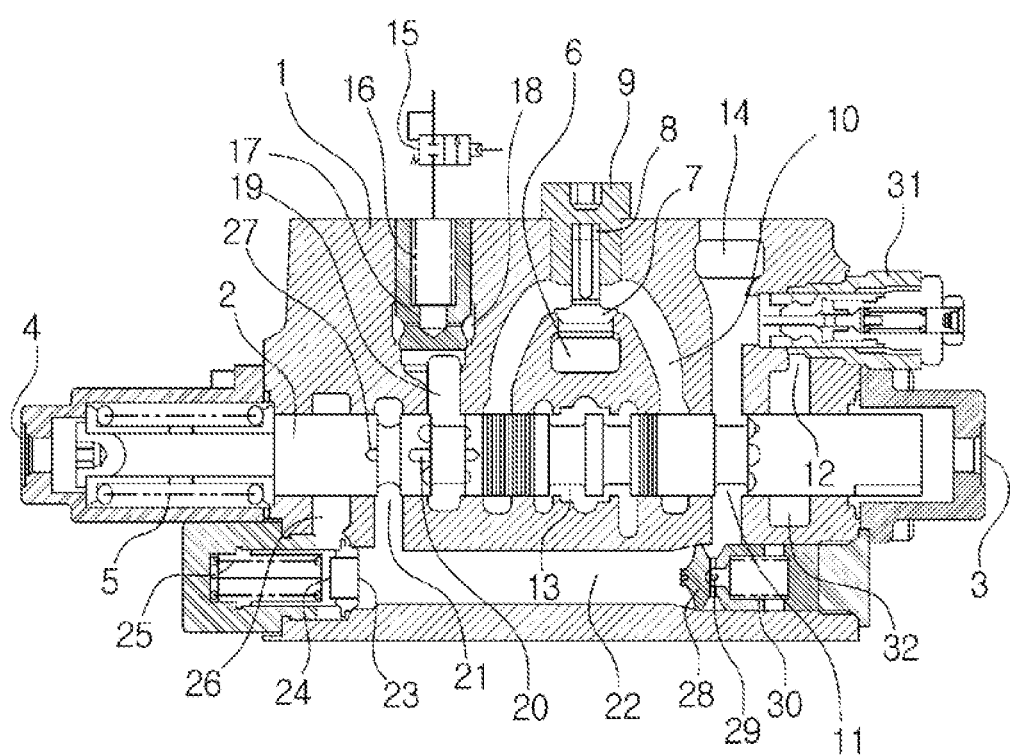

[FIG. 3]
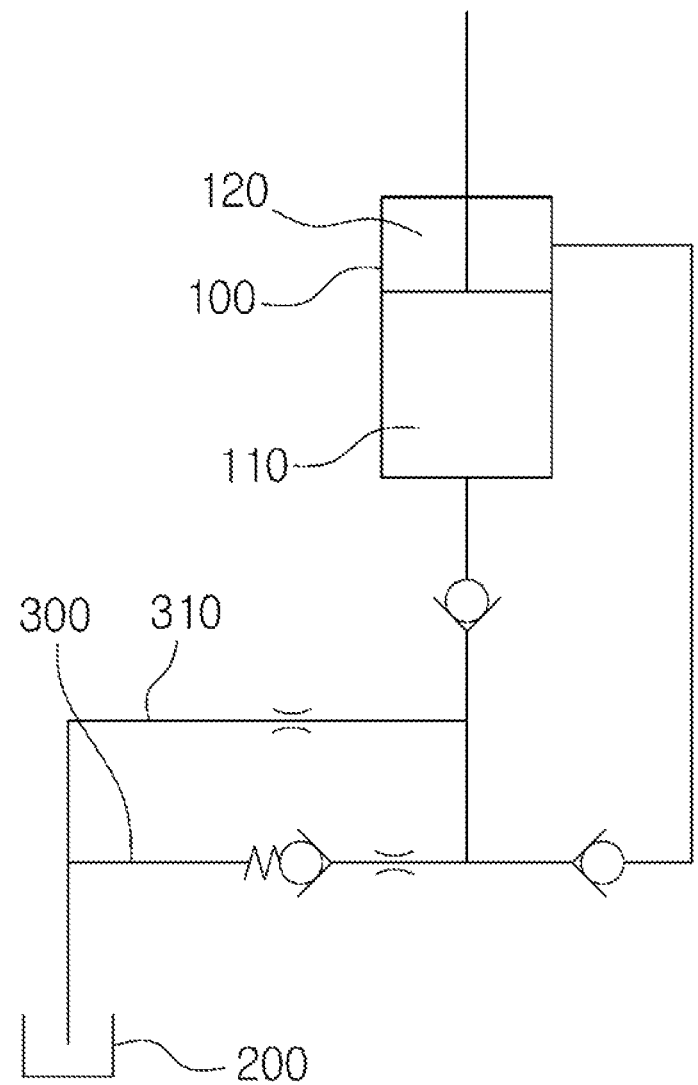

FLOW CONTROL VALVE FOR CONSTRUCTION MACHINE

BACKGROUND AND SUMMARY

The present invention generally relates to a flow control valve for a construction machine.

A hydraulic system of mid or heavy construction equipment such as excavators is provided with a control valve having a boom spool so as to control hydraulic fluid in the hydraulic system during the boom-up or boom-down operation.

FIG. 1 schematically shows a circuit diagram of a conventional hydraulic system during the boom-down operation. During the boom-down operation of an excavator, a boom spool is fed with pilot pressure and then moved in a control valve. Here, hydraulic fluid accommodated in a large chamber 110 in a boom cylinder 100 returns to a hydraulic tank 200 through the control valve via a return line 300. That is, the hydraulic fluid that returns from the large chamber of the boom cylinder 100 to the hydraulic tank 200 during the boom-down operation is introduced into the control valve and then flows against the pressure, which is set, to a boom booster poppet for the prevention of cavitation, to the hydraulic tank via a notch formed in the boom spool. The returning of the hydraulic fluid from the large chamber of the boom spool via the boom booster poppet, however, is not so problematic, because, in the case of heavy construction equipment such as an excavator, a stroke of the boom spool is short at an initial section of the boom-down operation so that the amount of the hydraulic fluid returning to the hydraulic tank is not great. However, when the stroke of the boom spool extends beyond the initial operation section, the amount of the hydraulic fluid returning to the hydraulic tank increases so that the returning amount of the hydraulic fluid relatively increases when considering a constant flow passage area. Then, when an allowable amount of the hydraulic fluid returning to the hydraulic tank via the boom booster poppet reaches a limit, the pressure of the large chamber of the boom cylinder consequently increases. This causes a problem of a slowdown in speed of the boom-down operation, and such an increased pressure of the large chamber of the boom cylinder during the boom-down operation adversely affects fuel efficiency.

Accordingly, the present invention has been made keeping in mind the above problems occurring in the related art, and an object of the present invention is to provide a flow control valve for a construction machine, capable of preventing an unnecessary increase in pressure of a large chamber of a boom cylinder during a boom-down operation while increasing boom-down speed.

To achieve the above and other objects, in accordance with an embodiment of the present invention, the present invention provides a flow control valve for a construction machine, the flow control valve controlling hydraulic fluid supplied from a hydraulic pump to a hydraulic actuator, the flow control valve including: a boom valve block connected to the hydraulic pump; a boom spool slidably coupled to the boom valve block and shifted to control hydraulic fluid supplied from the hydraulic pump to a boom cylinder in response to pilot signal pressure supplied to perform a boom-up or boom-down operation; and a boom-down flow control means for returning a part of hydraulic fluid returning from a large chamber of the boom cylinder to a hydraulic tank, through the boom spool only at a predetermined pressure or higher when the boom spool is shifted to perform the boom-down operation, and for returning a part of the hydraulic fluid returning from the large chamber of the boom cylinder, directly to the hydraulic tank through the boom spool and allowing a part of the hydraulic fluid returning from the large chamber of the boom cylinder to join a small chamber of the boom cylinder as a regeneration flow when the boom spool moves over a predetermined section.

Preferably, the boom-down flow control means may include a boom booster poppet mounted on the boom valve block in a path for returning a part of the hydraulic fluid returning from the large chamber of the boom cylinder to the hydraulic tank through a first spool notch of the boom spool to be opened only at the predetermined pressure or higher during the boom-down operation.

Preferably, the boom-down flow control means may include a second spool notch provided to be spaced apart from the first spool notch of the boom spool and to communicate with the path for returning a pan of the hydraulic fluid returning from the large chamber of the boom cylinder to the hydraulic tank so as to return the part of the hydraulic fluid directly to the hydraulic tank without passing through the boom booster poppet when the boom spool moves over the predetermined section during the boom-down operation.

According to the present invention, the flow control valve for a construction machine controls a flow rate returning to the hydraulic tank even when a great quantity of hydraulic fluid returns to the hydraulic tank from the large chamber of the boom cylinder after an initial section of the boom-down operation, thereby providing effects of preventing an abnormal increase in pressure of the large chamber of the boom cylinder and of increasing the boom-down speed, which is also advantageous in increasing fuel efficiency of a construction machine.

BRIEF DESCRIPTION OF THE DRAWINGS

FIG. 1 is a circuit diagram of a conventional hydraulic system during a boom-down operation;

FIG. 2 is a constructional view of a hydraulic control valve for a construction machine according to an embodiment of the present invention; and FIG. 3 is a circuit diagram of a hydraulic system during a boom-down operation according to an embodiment of the present invention.

DESCRIPTION OF THE REFERENCE NUMERALS IN THE DRAWINGS

1: Valve block
2: Boom spool
3: Boom-down pilot port
4: Boom-up pilot port
5: Spring
6: Pump path
7: Poppet
8: Spring
9: Plug
10: Bridge path
11: Path
12: Path
13: Path
14: Path
15: Holding valve
16: Spring
17: Holding poppet
18: Path
19: Path
20: first spool notch 21: Path
22: Path
23: Booster poppet
24: Orifice
25: Spring
26: Tank path
27: second spool notch
28: Regeneration poppet
29: Orifice
30: Spring
31: Port relief valve
32: Tank path
100: Boom cylinder
110: Larger chamber
120: Small chamber
200: Hydraulic Tank
300: Return line
310: Auxiliary return line

DETAILED DESCRIPTION

Hereinbelow, preferred embodiments of the present invention will be described with reference to the accompanying drawings. The description is provided for detailed illustration of the invention to allow a person skilled in the art to easily implement the invention, but is not intended to limit technical spirit and scope of the present invention. For clear illustration of the invention, unnecessary parts are not described and like parts are designated by like reference signs throughout the specification. In the specification and claims, unless otherwise described, the expression "an element including a component" means that the element may include other component(s) as well.

An embodiment of the present invention will now be described with reference to the accompanying drawings. FIG. 2 is a constructional view of a hydraulic control valve for a construction machine according to an embodiment of the present invention, and FIG. 3 is a circuit diagram of a hydraulic system during a boom-down operation according to an embodiment of the present invention.

Referring to FIG. 2, the flow control valve for a construction machine is an apparatus that controls hydraulic fluid supplied from a hydraulic pump to a hydraulic actuator. The flow control valve includes a boom valve block 1 that is connected to the hydraulic pump, a boom spool 2 that controls a boom-up or boom-down operation of a boom cylinder, a port 3 that supplies a pilot pressure signal for the boom-down operation to the boom spool 2, a port 4 that supplies a pilot pressure signal for the boom-up operation to the boom spool 2, a holding valve 15 that prevents leakage of the hydraulic fluid from a large chamber of the boom cylinder, and a holding poppet 17 that maintains the holding state of the holding valve.

Here, the boom spool 2 is installed in the boom valve block 2 such that the boom spool can slide, from side to side in FIG. 2. The boom spool has a first spool notch 20 and a second spool notch 27 that is spaced apart by a distance from the first spool notch 20. The boom spool 2 is shifted to control the hydraulic fluid supplied from the hydraulic pump to the boom cylinder in response to a pilot pressure signal to be supplied, thereby performing the boom-up or boom-down operation.

Further, the flow control valve includes a boom-up flow control means that supplies the hydraulic fluid from the hydraulic pump to the large chamber of the boom cylinder via the boom spool 2 when the boom spool 2 is shifted to perform the boom-up operation.

Further, the flow control valve includes a boom-down flow control means that supplies the hydraulic fluid from the hydraulic pump to a small chamber of the boom cylinder via the boom spool 2 when the boom spool 2 is shifted to perform the boom-down operation.

The boom-down flow control means returns to the hydraulic tank the hydraulic fluid that returns from the large chamber of the boom cylinder. Here, the boom-down flow control means returns to the hydraulic tank a part of the hydraulic fluid that returns from the large chamber of the boom cylinder, via the first spool notch 20 only at a predetermined pressure or higher. To this end, the boom-down flow control means includes a boom booster poppet 23 that font s back pressure so that the boom booster poppet is opened at a predetermined pressure or higher. The boom booster poppet 23 is mounted within the boom valve block 1 in a path through which the hydraulic fluid returning from the large chamber of the boom cylinder returns 10 the hydraulic tank through the first spool notch via the boom spool 2. The boom booster poppet 23 is operated to open the path only at the predetermined pressure or higher to provide the back pressure to the hydraulic fluid, thereby preventing a cavitation phenomenon. Further, the boom booster poppet provides back pressure to control boom-down speed so as to prevent sudden boom-down due to dead weight of a boom during the boom-down operation.

The boom-down flow control means allows a part of the hydraulic fluid returning from the large chamber of the boom cylinder to join hydraulic fluid to the small chamber of the boom cylinder as a regeneration flow. To this end, the boom-down flow control means includes a regeneration poppet 28 that allows a part of the hydraulic fluid returning from the large chamber of the boom cylinder to the hydraulic tank to join hydraulic fluid supplied to the small chamber of the boom cylinder as a regeneration flow when the boom spool 2 is shifted to perform the boom-down operation. The regeneration poppet 28 is mounted within the boom valve block 1.

Further, the boom-down flow control means returns a part of the hydraulic fluid, which returns from the large chamber of the boom cylinder, directly to the hydraulic tank through the second spool notch 27 via the boom spool 2 when the boom spool 2 moves over a predetermined section after the initial section of the boom-down operation. That is, the boom own flow control means returns the hydraulic fluid directly to the hydraulic tank without through the boom booster poppet 23 that is opened only at the predetermined pressure or higher.

The boom-down operation by the flow control valve will now be described.

When a remote control valve is operated to perform the boom-down operation, boom-down pilot pressure is applied to the boom-down pilot port 3. In the operation section during which initial pilot pressure is applied, the boom spool 2 is moved in the left direction in FIG. 2 within a predetermined distance in response to the pressure applied to the boom-down pilot port 3 of the boom valve block 1 (at this time, a spring 5, which is mounted to the inside of a cover attached to one side of the boom valve block 1, is applied with a compressive force).

Then, a neutral path 13 is closed and then the hydraulic fluid supplied from the hydraulic pump flows towards a bridge path 10 via a path 6 while moving up (as shown in FIG. 2) a poppet 7, which is slidably installed inside of a plug 9, (the moving-up motion of the poppet causes a spring 8 mounted between the plug 9 and the poppet 7 to be compressed).

The hydraulic fluid introduced into the bridge path 10 is supplied to the small chamber of the boom cylinder through a path 14 via a notch of the shifted boom spool 2. The hydraulic fluid contained in the large chamber of the boom cylinder driven to a contracted state is discharged from the boom cylinder and returns to the hydraulic tank. The hydraulic fluid from the large chamber of the boom cylinder flows to a path 18 connected to the large chamber of the boom cylinder. Then, simultaneously with input of the boom-down pilot pressure, a pilot pressure is applied to a boom holding valve 15 to operate so that a holding poppet 17 is opened. Then, the hydraulic fluid introduced into the path 18 flows through a path 19 and through a path 21 via the first spool notch 20 of the boom spool 2 and reaches an inlet of the boom booster poppet 23.

Here, a part of the hydraulic fluid introduced into the path 21 is applied to and shifts the regeneration poppet 28 in the right direction (as shown in FIG. 2) via a path 22 formed in the boom valve block 1 on the inlet of the boom booster poppet 23 (At this time, a spring 30 mounted at a rear side of the regeneration poppet 28 is applied with a compressive force). Thus, the hydraulic fluid introduced into the path 22 flows towards the small chamber of the boom cylinder as a regeneration flow sequentially via the path 11 and the path 14 until the pressure of the small chamber becomes higher than the pressure of the hydraulic fluid returning to the hydraulic tank.

In the meantime, a part of the hydraulic fluid introduced into the path 21 is applied to and shifts the boom booster poppet 23 in the left direction in FIG. 2 so that the part of the hydraulic fluid returns to the hydraulic tank through a tank path 26 (at this time, a spring 25 mourned at a rear side of the boom booster poppet 23 is applied with a compressive force).

The returning hydraulic fluid is not so problematic at an initial section of the boom-down operation because of a short stroke of the boom spool. However, when the stroke of the boom spool extends beyond the initial operation section, the amount of the hydraulic fluid returning from the large chamber of the boom cylinder increases, whereas the amount of the returning hydraulic fluid introduced into the tank path 26 via the boom booster poppet 23 reaches a limit. Consequently, there are problems of an increased pressure of the large chamber of the boom cylinder and of slowdown of the boom-down speed.

According to the flow control valve of the present invention, when boom-down pilot pressure is applied to the boom-down pilot port 3 so that a great quantity of hydraulic fluid returns from the large chamber of the boom cylinder after the initial section of the boom-down operation, the second spool notch 27, which is spaced forward (left direction in FIG. 2) from the first spool notch 20, is connected directly to the tank path 26 after the stroke of the boom spool 2 extends over a predetermined section. Thus, a part of the hydraulic fluid returning from the large chamber of the boom cylinder returns to the hydraulic tank through the tank path 26 via the boom booster poppet 23, and at the same time, a part of the hydraulic fluid returning from the large chamber of the boom cylinder through the second spool notch 27 returns to the hydraulic tank directly through the tank path 26 without passing through the boom booster poppet 23. Accordingly, the second spool notch 27 contributes to an increase in an area of a path through which hydraulic fluid returns to the hydraulic tank, facilitating the returning of the hydraulic fluid.

Referring to FIG. 3 showing a circuit diagram during the boom-down operation, at an initial boom-down operation of a construction machine, the introduction of the hydraulic fluid is not much, so the hydraulic fluid provided in the large chamber 110 of the boom cylinder 100 returns to the hydraulic tank 200 through a return line 300 via the boom booster poppet. Then, when the stroke of the boom spool extends over the initial operation section so that a great quantity of hydraulic fluid returns to the hydraulic tank 200, a part of the hydraulic fluid returning from the large chamber 110 of the boom cylinder 100 to the hydraulic tank 200 returns to the hydraulic tank through the return line 300 via the boom booster poppet, and at the same time, a part of the hydraulic fluid returns directly to the hydraulic tank through an auxiliary return line 310 via the second spool notch. Simultaneous returning of the hydraulic fluid from the large chamber 110 to the hydraulic tank 200 through such two return lines facilitates the returning of the hydraulic fluid so as to restrict an increase in pressure of the large chamber of the boom cylinder and to increase the boom-down speed. This is advantageous in increasing the fuel efficiency.

While the present invention has been described with reference to the preferred embodiments, those skilled in the art will appreciate that various modifications, additions and substitutions are possible, without departing from the scope and spirit of the invention as disclosed in the accompanying claims.

INDUSTRIAL APPLICABILITY

As described above, the present invention provides a flow control valve for a construction machine, the flow control valve being able to control a flow rate returning to the hydraulic tank even when a great quantity of hydraulic fluid returns to the hydraulic tank from the large chamber of the cylinder after an section of the boom-down operation, thereby providing effects of preventing an abnormal increase in pressure of the large chamber of the boom cylinder and of increasing the boom-down speed, which is also advantageous in increasing fuel efficiency of a construction machine.

What is claimed is:

1. A flow control valve for a construction machine, the flow control valve controlling hydraulic fluid supplied from a hydraulic pump to a hydraulic actuator, the flow control valve comprising:
   a boom valve block connected to the hydraulic pump;
   a boom spool slidably installed in the boom valve block and shifted to control hydraulic fluid supplied from the hydraulic pump to a boom cylinder in response to pilot signal pressure supplied to perform a boom-up or boom-down operation; and
   a boom-down flow control system for returning a first part of hydraulic fluid returning from a large chamber of the boom cylinder to a hydraulic tank, through the boom spool only at a predetermined pressure or higher when the boom spool is shifted to perform the boom-down operation, for returning a second part of the hydraulic fluid returning from the large chamber of the boom cylinder directly to the hydraulic tank through the boom spool, and for allowing a third part of the hydraulic fluid returning from the large chamber of the boom cylinder to join a small chamber of the boom cylinder as a regeneration flow when the boom spool moves over a predetermined section;
   wherein the boom-down flow control system includes a boom booster poppet mounted on the boom valve block in a first path for returning the first part of the hydraulic fluid returning from the large chamber of the boom cylinder to the hydraulic tank through a first spool notch of the boom spool, the boom booster poppet to be opened only at the predetermined pressure or higher during the boom-down operation; and wherein the boom-down flow control system includes a second spool notch provided to be spaced apart from the first spool notch of the boom spool and to communicate with a second path for returning the second part of the hydraulic fluid returning from the large chamber of the boom cylinder to the hydraulic tank so as to return the second part of the hydraulic fluid directly to the hydraulic tank without passing through the boom booster poppet when the boom spool moves over the predetermined section during the boom-down operation.

* * * * *